United States Patent [19]

Hoffmann

[11] Patent Number: 4,641,558
[45] Date of Patent: Feb. 10, 1987

[54] ROTATABLE SHAFT ASSEMBLY

[75] Inventor: Wolfgang Hoffmann, Modesto, Calif.

[73] Assignee: B & H Manufacturing Company, Ceres, Calif.

[21] Appl. No.: 766,394

[22] Filed: Aug. 16, 1985

[51] Int. Cl.[4] ............................................. B26D 7/26
[52] U.S. Cl. ........................................ 83/152; 83/344; 83/346; 83/349; 83/700; 384/563; 384/583; 464/178
[58] Field of Search ................. 83/152, 344, 346, 347, 83/349, 700; 464/178; 384/563, 571, 583

[56] References Cited

U.S. PATENT DOCUMENTS

| | | | |
|---|---|---|---|
| 1,631,557 | 6/1927 | Sponable | 384/583 |
| 3,720,126 | 3/1973 | Kranz | 83/344 |
| 3,726,576 | 4/1973 | Barnbrook et al. | 384/563 |
| 3,946,629 | 3/1976 | Achelpohl | 83/304 |
| 4,112,786 | 9/1978 | Thomas | 464/178 X |
| 4,428,265 | 1/1984 | Bolton | 83/700 X |
| 4,500,386 | 2/1985 | Hoffmann | 156/449 |

Primary Examiner—Frank T. Yost
Attorney, Agent, or Firm—Willis E. Higgins; Edward B. Gregg

[57] ABSTRACT

A precision centerable, rotatable shaft assembly (60) has a shaft (62) and a housing (64) extending generally axially along the shaft (62). The shaft (62) is journalled to the housing (64) by a first roller bearing assembly (66) and a second roller bearing assembly (68). The first roller bearing assembly (66) is connected to the shaft (62) near end (80) and a second roller bearing assembly (68) is connected to the shaft (62) near end (83). The first roller bearing assembly has a first inner race (70) fixedly attached to the shaft (62) and a first outer race (74) fixedly attached to the housing (64). The outer race has an inner surface (78) tapering toward the shaft (62) approaching the end of the shaft (62). The second roller bearing assembly has a second inner race (82) fixedly attached to the shaft (62) and a second outer race (86) axially movable within the housing (64) toward the first roller bearing (66). The second outer race (86) has an inner surface (91) tapering away from the shaft (62) moving toward the first roller bearing assembly (66). A flange (94), rod (96) and micrometer (100) are attached to the second roller bearing assembly (68) so that adjustment of the micrometer (100) moves the second outer race (86) downward within housing (64) to compensate for wear of the bearing assemblies (66) and (68) in use of the rotatable shaft assembly (60).

8 Claims, 5 Drawing Figures

ROTATABLE SHAFT ASSEMBLY

BACKGROUND OF THE INVENTION

1. Field of the Invention

This invention relates to an assembly which allows a rotatable shaft to be centered on an axis with a high degree of precision. More particularly, it relates to such an assembly in which a rotatable shaft mounted in bearings is maintained centered on the axis despite wear of the bearings during use of the shaft. Most especially, it relates to such an assembly particularly adapted for use with a cutter of a high speed labeling machine.

2. Description of the Prior Art

High speed roll fed labeling systems are in widespread use in the packaging industry. For example, such a system is disclosed in the following commonly assigned issued patents: Hoffmann, U.S. Pat. No. 3,765,991, issued Oct. 16, 1973; Hoffmann, U.S. Pat. No. 3,834,963, issued Sept. 10, 1974; Hoffmann, U.S. Pat. No. 4,108,710, issued Aug. 22, 1978; Hoffmann, U.S. Pat. No. 4,108,711, issued Aug. 22, 1978 and Hoffmann, U.S. Pat. No. 4,500,386, issued Feb. 19, 1985. As disclosed, in this system, continuous, preprinted label stock is fed between a rotating cutter blade and a stationary cutter blade which is pivoted into its stationary position as the rotary blade moves past the stationary position. The label stock is cut as the two blades pass each other very closely. A second example of such a system is disclosed in commonly assigned Hoffmann, U.S. Pat. No. 4,181,555, issued Jan. 1, 1980 and Dickey, U.S. Pat. No. 4,188,843, issued Feb. 19, 1980. In this system, the continuous, preprinted label stock is fed between an anvil roller and a rotary cutter to sever the label stock into individual labels. Conventionally, the label stock is paper, a paper plastic lamination, a foil paper lamination and similar stiff materials.

More recently, there has been a demand for machinery capable of applying soft film labels. The soft film labels are fabricated from plastic materials that are usually less expensive and have more sparkle and sales appeal than the conventional stiff material labels. However, these soft film label materials have characteristics that make them difficult to handle on high speed roll fed machines. These difficulties arise from the limpness of the material and static charges which tend to reside on such labels. A major difficulty arises in cutting these soft materials with conventional equipment. Very close tolerances of the cutting equipment are required to cut these materials reliably at high speeds. In particular, a highly accurate distance and near zero clearance must be maintained between the rotary cutter blade and its associated pivotable, stationary cutter blade or anvil roller.

The shafts for the rotary cutter and the stationary cutter or anvil roller are rotatably supported in ball bearings or roller bearings and are adjusted to the required positions when the labeling system is installed. However, with wear of the bearings, the rotary cutter and stationary cutter or anvil roller become free to change their spacing with respect to one another. Some prior art cutter assemblies include the ability to adjust for bearing wear, but adjustment of such prior art assemblies requires a skilled technician and cannot be accomplished by a typical user of the labeling system.

SUMMARY OF THE INVENTION

Accordingly, it is an object of this invention to provide a precision centerable shaft assembly which will allow convenient adjustment to compensate for bearing wear.

It is another object of the invention to provide a high speed labeling system including a cutter which will reliably cut soft film labels with continued use.

It is a further object of the invention to provide a cutter having a rotating cutter blade and a stationary cutter blade or an anvil roller in which a precisely predetermined distance between shafts for the rotary cutter blade and for the stationary cutter blade or the anvil roller and a near zero clearance between the rotary cutter blade and the stationary cutter blade or the anvil roller can be maintained.

The attainment of these and related objects may be achieved through use of the novel precision centerable, rotatable shaft assembly herein disclosed. An assembly in accordance with this invention includes a shaft having a first end and a second end, and a housing extending generally axially along the shaft. The shaft is journalled in a first roller bearing assembly proximate to the first end of the shaft. The first roller bearing assembly has a first inner race fixedly attached to the shaft. A first outer race is fixedly attached to the first housing. A plurality of rollers is positioned between the first inner and outer races. The first outer race has an inner surface tapering toward the shaft approaching the first end of the shaft. The shaft is journalled to a second roller bearing assembly proximate to the second end of the shaft. The second roller bearing assembly includes a second inner race fixedly attached to the first shaft and a second outer race axially movable within the first housing toward the first roller bearing assembly. A plurality of rollers is positioned between the second inner and outer races. The second outer race has an inner surface tapering away from the shaft approaching the first roller bearing assembly. A means urges the second outer race toward the first roller bearing assembly.

In operation, the assembly of this invention compensates for bearing wear by movement of the second outer race toward the first roller bearing assembly by adjustment of the urging means. When the assembly is initially installed, the urging means is adjusted so that the shaft will rotate on the bearings, but there is no tolerance in the bearings permitting lateral movement of the axis of rotation of the shaft. Due to the shape of the outer race of the second roller bearing assembly, a force applied to urge the second outer race toward the first roller bearing assembly is also applied to the first inner race of the first roller bearing assembly to eliminate clearance in that bearing assembly as well. The shape of the first inner race of the first roller bearing assembly also allows the first inner race to be mounted on the shaft, then assembled with the first outer race from above readily.

In a cutter utilizing the rotatable shaft assembly of this invention, two of the rotatable shaft assemblies in accordance with the invention are employed. A rotary cutter blade is mounted on the shaft of the first shaft assembly and a pivotable stationary cutter blade or an anvil roller which coacts with the rotary cutter blade is mounted on the shaft of the second rotatable shaft assembly. The two shaft assemblies are positioned with respect to each other so that the rotatable cutter blade will have near zero clearance with the stationary cutter blade or the anvil roller by adjustment of the urging means of the two rotatable shaft assemblies. As bearing wear occurs, further adjustment of the urging means allows the near zero clearance to be maintained with continued use of the cutter.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
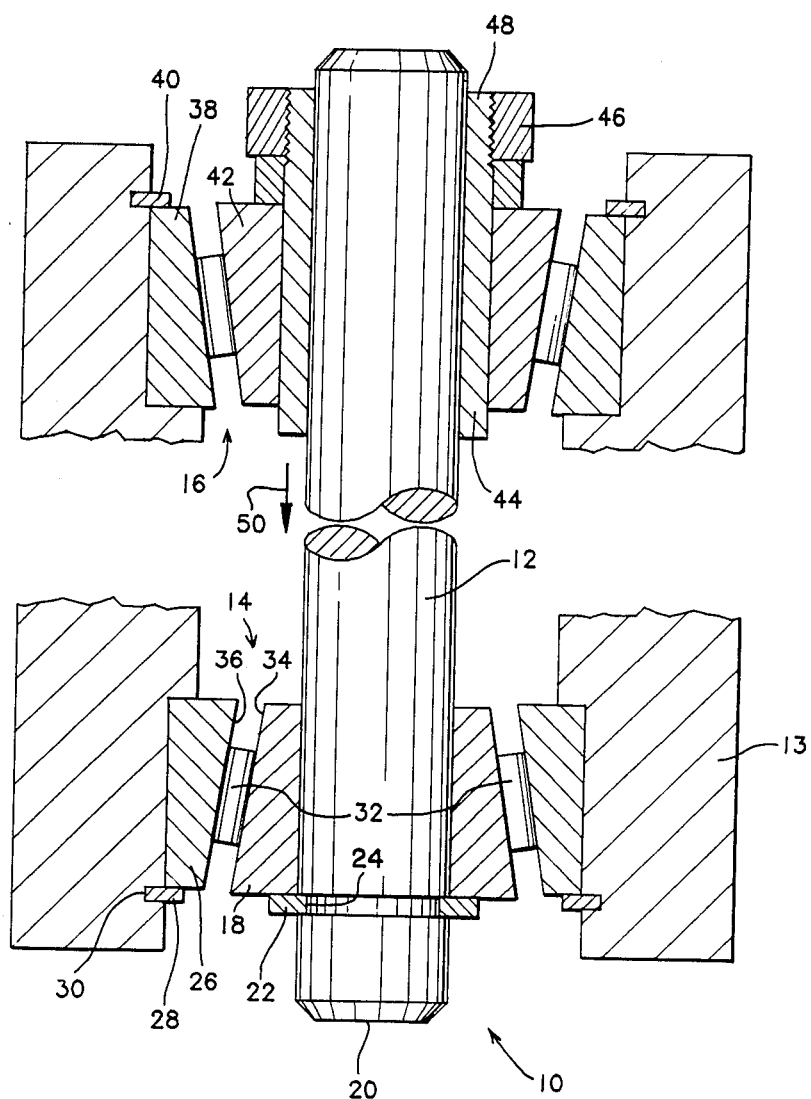
FIG. 1 is a cross section view of a prior art rotatable shaft assembly.

Turning now to the drawings, more particularly to FIG. 1, there is shown a prior art rotatable shaft assembly 10, which represents the closest prior art known to the inventor. In the assembly 10, shaft 12 is journalled within housing 13 by means of first and second roller bearing assemblies 14 and 16. The first bearing assembly 14 has an inner race 18 fixedly attached to shaft 12 near end 20 by means of split ring washer 22 extending into groove 24. An outer race 26 is fixedly attached to the housing 14 by a similar split ring washer 28 extending into groove 30. A plurality of rollers 32 are positioned between the inner and outer races 18 and 26 in a conventional manner. As shown, the inner race 18 has an inclined surface 34 which tapers away from the shaft 12 approaching end 20. Similarly, the outer race 26 has a mating inclined surface 36 which also tapers away from the shaft 12 moving toward end 20.

The upper bearing assembly 16 has an outer race 38 which is fixedly attached to the housing 13 by split ring washer 40 in the same manner as the outer race 26 of the bearing assembly 14. Inner race 42 is attached to the shaft 12 by means of a clamp sleeve 44. Nut 46 is threaded to end 48 of the clamp sleeve 44, so that turning the nut 46 will allow the inner race 42 to move axially on the shaft 12, as indicated by arrow 50.

In practice, the assembly 10 is made by attaching the inner race 18 to the shaft 12, the outer races 26 and 38 to the housing 13, then inserting the shaft 12 into the housing 13 from the bottom as shown. The shaft 12 is pushed upward so that the inner race 18 and rollers 32 push against the outer race 26. At the same time, nut 46 is fastened to the clamp sleeve 44 to position the inner race 42 with respect to the outer race 38. Nut 46 is adjusted so that the shaft 12 is centered with no clearance in the bearing assemblies 14 and 16, but so that the shaft 12 will rotate. As the bearing assemblies 14 and 16 wear, nut 46 is further tightened to eliminate resulting clearance, which would otherwise allow the axis of rotation of shaft 12 to shift laterally.

A principal problem with the prior art rotatable shaft assembly 10 of FIG. 1 is that the nut 46 can only be reached with considerable difficulty when the assembly 10 is incorporated in a labeling system. Adjustment of the shaft assembly 10 therefore requires some disassembly of the labeling system and must be done by a skilled technician.

Figure 2:
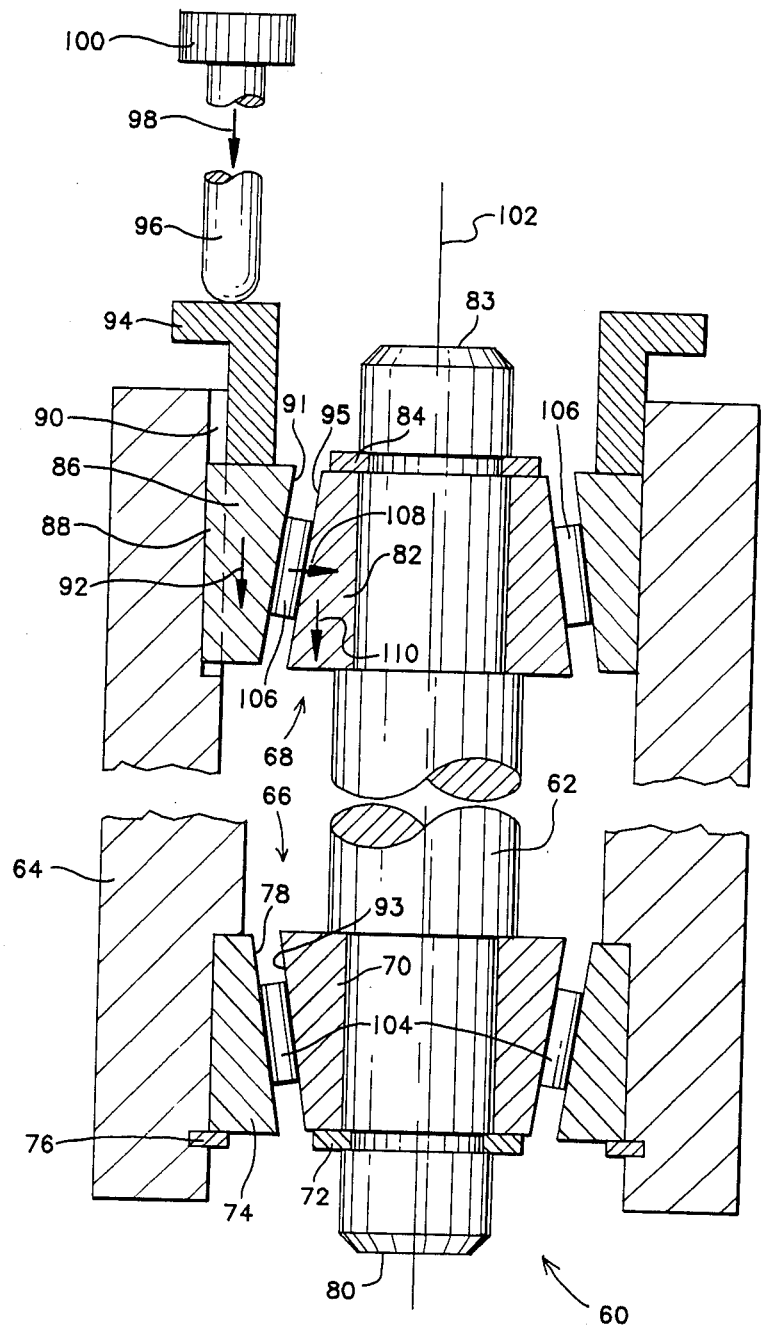
FIG. 2 is a similar cross section view of a rotatable shaft assembly in accordance with the invention.

FIG. 2 shows a precision centerable, rotatable shaft assembly 60 in accordance with this invention, which is capable of user adjustment. Shaft 62 is journalled within housing 64 by first and second roller bearing assemblies 66 and 68. The first bearing assembly 66 has an inner race 70 fixedly attached to the shaft 62 by split ring washer 72 and an outer race 74 fixedly attached to the housing 64 by split ring washer 76. The outer race 74 has an inner surface 78 which tapers toward the shaft 62 moving toward end 80 of the shaft 62.

The second bearing assembly 68 has an inner race 82 that is fixedly attached to the shaft 62 by means of split ring washer 84. Outer race 86 of the bearing assembly 68 is attached to the housing 64 by means of tongue 88 and groove 90, to prevent the outer race 86 from rotating, but to allow vertical movement of it within the housing, as indicated by arrow 92. Surface 91 of the outer race 86 tapers away from the shaft 62 moving away from end 83 of the shaft 62 toward the first roller bearing assembly 66. Surfaces 93 and 95 on the inner races 70 and 82 are parallel to their respective mating surfaces 78 and 91. A flange 94 is fixedly attached to the outer race 86 and extends from the housing 64 to engage biasing rod 96, which applies downward force to the flange 94, as indicated by arrow 98. The biasing rod 96 is connected to an adjustable micrometer 100, which is fixedly attached to a structural member of a labeling system (not shown) on which the shaft assembly 60 is installed. Adjustment of the micrometer 100 during use of the rotatable shaft assembly 60 moves the biasing rod 96 downward as needed to compensate for wear of the bearing assemblies 66 and 68, to maintain the shaft 62 precisely centered on a desired axis of rotation 102.

Figure 3:
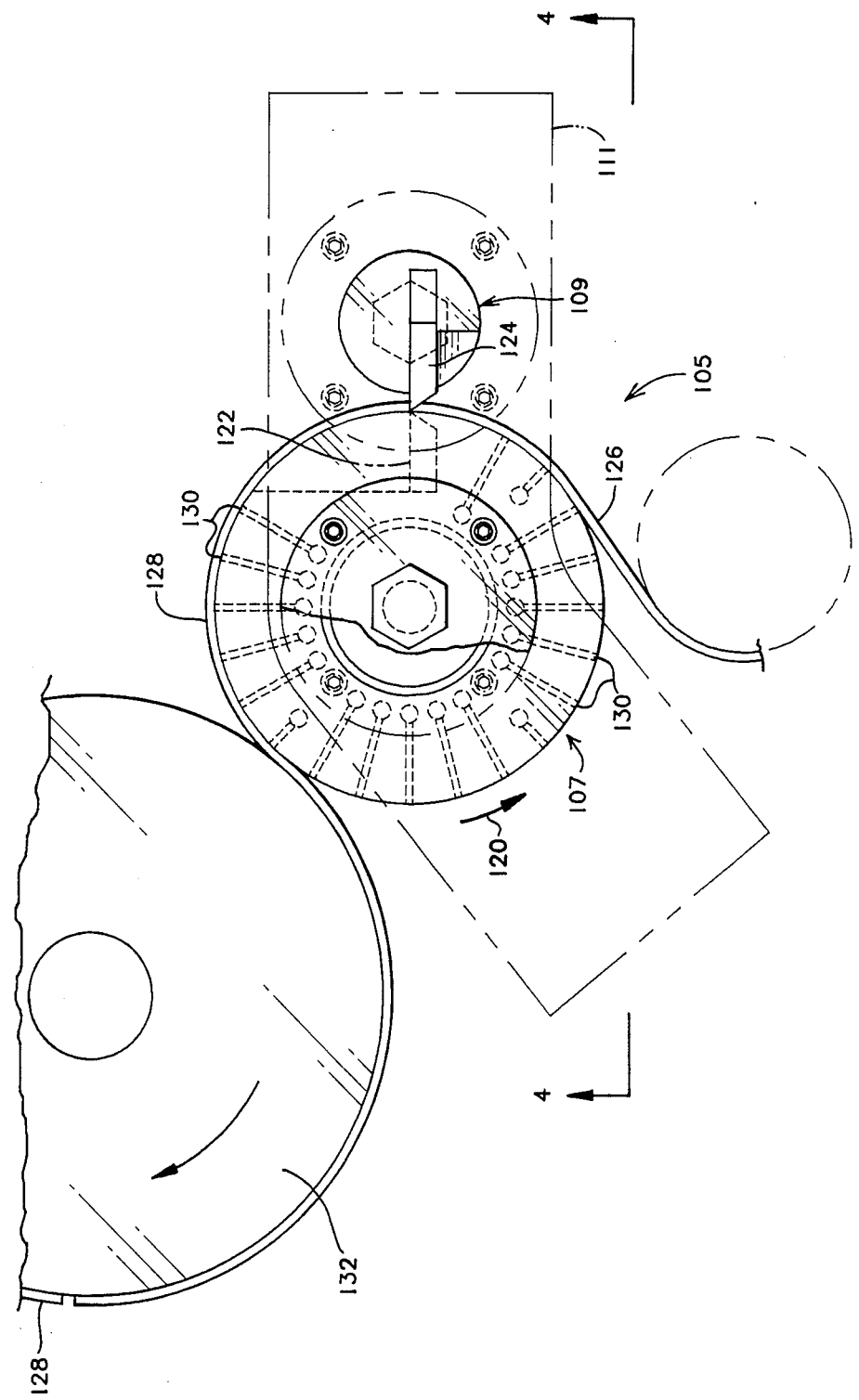
FIG. 3 is a plan view of a cutter assembly in accordance with the invention, with partial cutaways to show detail.
Figure 4:
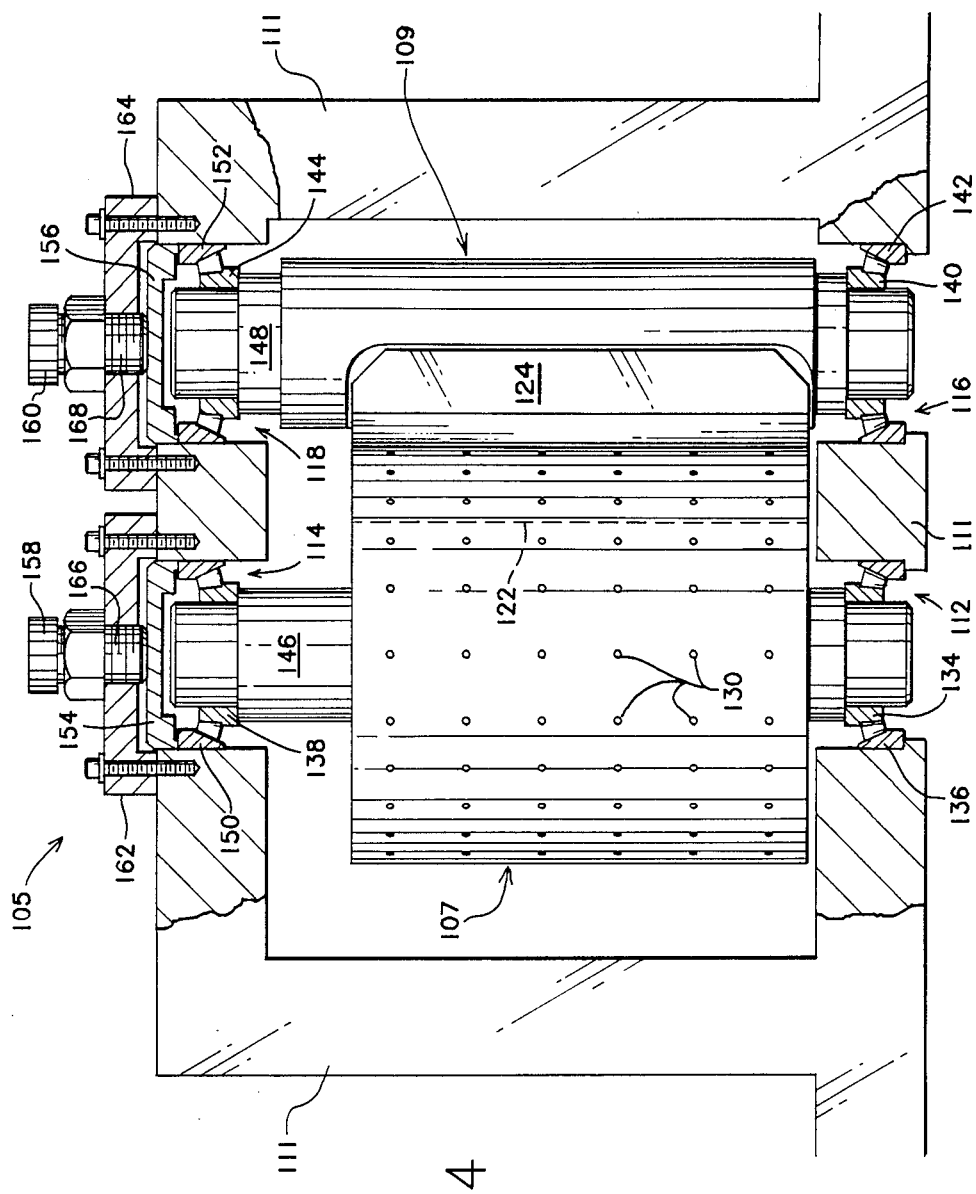
FIG. 4 is a partial section view taken along the line 4—4 in FIG. 3.

To make the rotatable shaft assembly 60, the inner races 70 and 82 are attached to the shaft 62 and the outer race 74 is attached to the housing 64. The shaft 62 is then inserted into the housing 64 from above, so that rollers 104 of the bearing assembly 66 are in engagement with the inner and outer races 70 and 74. The weight of the shaft 62 eliminates clearance in the bearing assembly 66 The outer race 86 is then inserted in the housing 64 and the biasing rod 96 and micrometer 100 installed. Micrometer 100 is then adjusted to apply sufficient downward force through biasing rod 96 to the outer race 86 so that clearance between the outer race 86, rollers 106 and the inner race 82 is eliminated. Due to the shape of the outer race 86 and the inner race 82, a component of the vertical force 98 is applied horizontally to the inner race 82, as indicated by arrow 108 and another component vertically through the inner race 82 downward to the roller bearing assembly 66, as indicated by arrow 110. The micrometer is adjusted so that no clearance exists in the bearing assemblies 66 and 68, but the shaft 62 is free to rotate about axis 102. If the micrometer 100 is adjusted to supply too much downward force 98 to the rotatable shaft assembly 60, shaft 62 will seize up and not be free to rotate. As the bearing assemblies 66 and 68 wear with continued use, the micrometer 100 is further adjusted to move the force applying rod 96 downward to eliminate clearances in the bearing assemblies 66 and 68. Such adjustment of the micrometer 100 is easily accomplished by a user of a labeling system incorporating the rotatable shaft assembly 60 without disassembly of the labeling system FIGS. 3 and 4 show a cutter assembly 105 in accordance with the invention. A rotary cutter 107 and a stationary cutter 109 are journaled to frame 111 by lower and upper bearing assemblies 112, 114, 116 and 118, respectively. Rotary cutter 107 rotates in a counterclockwise direction, as indicated by arrow 120. Cutter blade 122 of the rotary cutter 107 is therefore moved past blade 124 of the stationary cutter with each revolution. The stationary cutter 109 is so named because the blade 124 remains stationary during the actual cutting of sheet 126 into individual labels 128. Other than when making the cut, the stationary cutter 109 is pivoted on the bearing assemblies 116 and 118 to move the blade 124 out of the feed path of the sheet 126 between cuts. Rotary cutter 107 includes a plurality of openings 130, to form a vacuum drum similar to the vacuum drums in the sheet feed paths described in the above referenced, commonly assigned prior art patents. The vacuum apertures 130 allow the rotary cutter 107 to be used as part of the feed path for moving the sheet 126 and the labels 128 through the cutter assembly 105. After the labels 128 have been severed from the sheet 126, they are carried by the rotary cutter 107 for transfer to a vacuum drum 132 of the type disclosed in the above referenced, commonly assigned patents, for further processing in the labeling machine incorporating the cutter assembly 105. Further details on the labeling machine itself are available in the above referenced, commonly assigned prior art patents.

The inner and outer races 134, 136, 138, 140, 142 and 144 are fixedly attached to shafts 146 and 148 and the frame 111 in the same manner as the corresponding races in FIG. 2. The outer races 150 and 152 of the upper bearing assemblies 114 and 118 are slidably mounted with a tongue and groove construction to the frame 111 for downward movement in the same manner as in FIG. 2. Yokes 154 and 156 engage the upper, outer races 150 and 152 to bias them downward. Stems 158 and 160 extending from the yokes 154 and 156 are precision threaded to support plates 162 and 164 at 166 and 168. The support plates 162 and 164 are in turn fixedly attached to the frame 110. Turning the stems 158 and 160 in a clockwise direction provides a micrometer action to cause the yokes 154 and 156 to move the races 150 and 152 downward to compensate for bearing wear and keep the shafts 146 and 148 precisely centered in the same manner as in the assembly 60 of FIG. 2. A suitable lock washer (not shown) prevents counter rotation of the stems 158 and 160.

Figure 5:
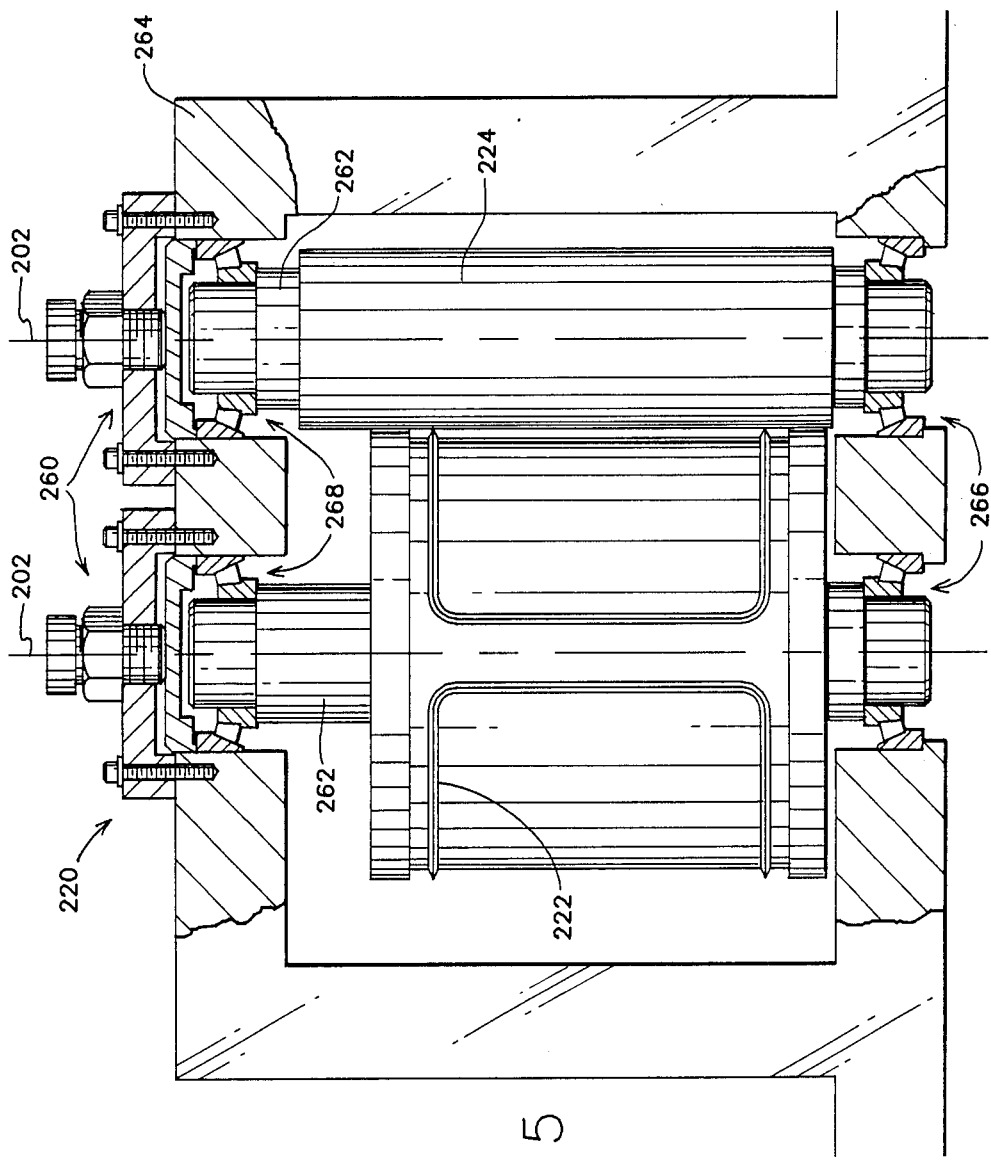
FIG. 5 is a cross section view of another cutter assembly in accordance with the invention.

FIG. 5 shows another embodiment of a cutter assembly 220 formed from a pair of rotatable shaft assemblies 260 in accordance with the invention. One of the shafts 262 has a rotatable cutter blade 222 mounted on it, and the other shaft 262 has a conventional anvil roller 224 mounted on it. The axes of rotation 202 of the shafts 62 are positioned so that there is a near zero clearance between the cutting blade 222 and the roller 224 as the shafts 262 rotate. The shafts 262 are journalled in housing 264 by means of upper and lower bearing assemblies 266 and 268 in the same manner as in the FIGS. 3-4 embodiment. The use of the rotatable shaft assemblies 260 in the cutter 220 means that this near zero clearance can be maintained very precisely, despite wear in the roller bearing assemblies 266 and 268. Other than as shown and described, the construction and operation of the FIG. 5 embodiment is the same as in the FIGS. 3-4 embodiment of the invention.

The extent of the near zero clearance in both the FIGS. 3-4 and the FIG. 5 embodiments should be kept as small as possible, and can be greater or lesser for different label stock. For example, with a soft label stock of 0.0005 inch thick soft plastic material, a clearance of 0.0001 inch or less should be utilized. With thinner label stock, a correspondingly lesser clearance should be utilized, and for a thicker and/or a stiffer label stock, a greater clearance is tolerable.

It should now be readily apparent to those skilled in the art that a novel precision centerable, rotatable shaft assembly capable of achieving the stated objects of the invention has been provided. The rotatable shaft assembly of this invention provides convenient adjustment by means of the micrometer 100 to compensate for bearing wear. Such adjustment gives a cutter for use in a labeling system in which a precisely predetermined distance between shafts for the rotary cutter blade and the stationary cutter blade or the anvil roller and a near zero clearance can be maintained between the rotary cutter blade and the stationary cutter blade or the anvil roller. The use of a cutter incorporating the rotatable shaft assembly of this invention allows soft film labels to be cut reliably in a high speed labeling machine despite bearing wear with continued use.

It should further be apparent to those skilled in the art that various changes in form and details of the invention as shown and described may be made. It is intended that such changes be included within the spirit and scope of the claims appended hereto.

What is claimed is:

1. A precision centerable, rotatable shaft assembly, which comprises: a first shaft having a first end and a second end, a first housing extending generally axially along said shaft, said shaft being journalled in said housing by a first roller bearing assembly connected to said first shaft proximate to the first end of said first shaft, said first roller bearing assembly including a first inner race fixedly attached to said shaft, a first outer race fixedly attached to said first housing, and a plurality of rollers positioned between the first inner and outer races, the first outer race having an inner surface tapering toward said shaft approaching the first end of said shaft, a second roller bearing assembly connected to said first shaft proximate to the second end of said first shaft, said second roller bearing assembly including a second inner race fixedly attached to said shaft, a second outer race axially movable within said first housing toward said first roller bearing assembly, and a plurality of rollers positioned between the second inner and outer races, the second outer race having an inner surface tapering away from said shaft approaching said first roller bearing assembly, and adjustable means including a micrometer connected to supply force to a force applying member movable axially along said shaft toward the first shaft end urging the second outer race toward said first roller bearing assembly.

2. The rotatable shaft assembly of claim 1 in which said the micrometer of said adjustable urging means extends beyond the second end of said shaft.

3. The rotatable shaft assembly of claim 1 additionally comprising a first cutter blade mounted on said first shape to rotate said first shaft.

4. A cutter, comprising, in combination, the rotatable shaft assembly of claim 3, a second precision centerable, rotatable shaft assembly, which comprises: a second shaft having a first end and a second end, a second housing extending generally axially along said second shaft, said second shaft being journalled in said second housing by a third roller bearing assembly proximate to the first end of said second shaft, said third roller bearing assembly including a third inner race fixedly attached to said second shaft, a third outer race fixedly attached to said second housing, and a plurality of rollers positioned between the third inner and outer races, the third outer race having an inner surface tapering toward said second shaft approaching the first end of said second shaft, a fourth roller bearing assembly proximate to the second end of said second shaft, said fourth roller bearing assembly including a fourth inner race fixedly attached to said second shaft, a fourth outer race axially movable within said second housing toward said third roller bearing assembly, and a plurality of rollers positioned between the fourth inner and outer races, the fourth outer race having an inner surface tapering away from said second shaft approaching said third roller bearing assembly, second adjustable means including a second micrometer connected to supply force to a second force applying member movable axially along said second shaft toward the first end of said second shaft urging the fourth outer race toward said third roller bearing assembly, and a means mounted on said second shaft configured and positioned to coact with said first cutter blade to cut a sheet material positioned between first said coacting means and said first cutter blade as said first cutter blade is rotated past said coacting means.

5. The combination of claim 4 in which said second the micrometer of said second adjustable urging means extends beyond the second end of said second shaft.

6. The combination of claim 4 in which said coacting means comprises a second cutter blade positioned to be provided at a stationary cutting position while said first cutter blade is rotated past said second cutter blade, said second cutter blade being pivotable on said second shaft away from the stationary cutting position.

7. The combination of claim 6 in which said first cutter blade is mounted on said first shaft by attachment to a vacuum drum on said first shaft, said vacuum drum having a surface with a plurality of vacuum apertures for engaging the sheet material.

8. The combination of claim 4 in which said coacting means comprises an anvil roller mounted for rotation on said second shaft.

* * * * *